United States Patent [19]

Leonard

[11] 4,343,646

[45] Aug. 10, 1982

[54] METHOD FOR PRODUCING FERTILIZER FROM WASTE PAPER

[75] Inventor: Richard P. Leonard, West Seneca, N.Y.

[73] Assignee: Calspan Corporation, Buffalo, N.Y.

[21] Appl. No.: 102,181

[22] Filed: Dec. 10, 1979

[51] Int. Cl.³ .......................... C05F 11/00; C08B 5/02
[52] U.S. Cl. .......................................... 71/25; 71/23; 536/30; 536/35
[58] Field of Search ................... 71/14, 25, 37, 39, 41, 71/64 JC, 23; 162/4, 81; 536/30, 35

[56] References Cited

U.S. PATENT DOCUMENTS

| | | | |
|---|---|---|---|
| 2,074,339 | 3/1937 | Miles | 162/81 |
| 2,097,120 | 10/1937 | Fink | 536/30 |
| 2,110,545 | 3/1938 | Dreyfus | 162/81 |
| 2,574,027 | 11/1951 | Farber | 71/24 |
| 2,735,756 | 2/1956 | Farber | 71/25 |
| 3,130,115 | 4/1964 | Thomsen | 162/81 X |
| 3,252,785 | 5/1966 | Hoblit | 71/41 X |
| 3,269,824 | 8/1966 | Aswell | 71/25 X |
| 3,533,775 | 10/1970 | Brown | 71/9 |
| 3,576,709 | 4/1971 | Menzies | 71/23 X |
| 3,933,577 | 1/1976 | Penque | 71/14 X |
| 4,006,005 | 2/1977 | Seferian et al. | 71/41 X |
| 4,124,758 | 11/1978 | Watts, Jr. et al. | 536/30 X |

*Primary Examiner*—Arnold Turk
*Attorney, Agent, or Firm*—Biebel, French & Nauman

[57] ABSTRACT

Waste paper is shredded and reacted with nitric acid to produce nitrated cellulose in which the inorganic nitrate ion is organically bound to the cellulosic waste paper. The resultant product is neutralized to enhance its stability and is suitable for use as a nitrogen fertilizer and soil conditioner. When phosphoric acid is added prior to neutralization with potassium hydroxide a complete N-P-K fertilizer results.

16 Claims, No Drawings

METHOD FOR PRODUCING FERTILIZER FROM WASTE PAPER

BACKGROUND OF THE INVENTION

The present invention relates to a method for producing a fertilizer and soil conditioner from a shredded or particulate cellulosic material, and, more particularly, it relates to a method for nitration of waste paper to produce a fertilizer and soil conditioner.

Materials such as sawdust and newspaper are essentially cellulose. When added to soil, these materials increase the moisture holding capacity of the soil and improve its physical condition or tilth. The principal problem associated with the incorporation of shredded paper, sawdust, etc. in soil is the high carbon to nitrogen ratio created in the soil. The reason for this condition is that when soil bacteria use cellulosic material as an energy substrate, the bacteria also deplete the soil of available nitrogen thereby depriving plants of nitrogen to such an extent that a nitrogen deficiency occurs in plants. It would, therefore, be desirable to supply make-up nitrogen along with such soil conditioners.

Nitric acid reacts with cellulose to form cellulose nitrate or nitrocellulose. The traditional process for production of nitrocellulose is not suitable for the production of a fertilizer from waste paper. In the classical method for the production of nitrocellulose, concentrated sulfuric acid is ordinarily present to take up the water which is produced in the reaction, as follows:

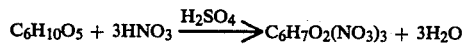

$$C_6H_{10}O_5 + 3HNO_3 \xrightarrow{H_2SO_4} C_6H_7O_2(NO_3)_3 + 3H_2O$$

In this reaction, the average composition of the acids used is 21% $HNO_3$ and 63% $H_2SO_4$. While this is true of known nitration reactions, it has been found that in the production of a fertilizer, the use of sulfuric acid is undesirable since high amounts of bases such as KOH or $Ca(OH)_2$ would be needed to neutralize the sulfuric acid. Since all of the added chemicals would appear in the final product, high amounts of sulfur in such compounds as $K_2SO_4$ and $CaSO_4$, would be present as a result of neutralization. This is undesirable because sulfur is required in only minor amounts for plant nutrition and is acid forming in soil.

Likewise, in the traditional process, finished nitrocellulose is washed with copious amounts of water and may have a chemical stabilizer added. However, this means that an acidic product is produced which could adversely effect plant growth or result in product degradation. Finally, the traditional process for producing nitrated cellulose products results in materials containing varying amounts of nitrogen for differing uses:

10.7–11.2% N—celluloid
11.8–12.3% N—lacquers
12.6–13.5% N—explosives

From the standpoint of fertilizer production such high amounts of nitrogen content are not desired because of increased flammability and/or explosivity hazard.

Still it would be highly desirable to be able to produce a nitrogen fertilizer from waste paper. This would have the advantage of providing an ecologically sound disposal of such cellulosic materials and the agricultural benefit of providing a cheap and effective source of fertilizer.

Accordingly, the need exists for a method for producing a fertilizer from shredded or particulate cellulosic material such as waste paper by a nitration reaction which has none of the disadvantages of the traditional process for production of nitrocellulose.

SUMMARY OF THE INVENTION

The present invention meets that need by providing a process for nitration of cellulosic material so that the resultant product can effectively be used as a fertilizer and soil conditioner. The fertilizer production process involves the steps of:

(a) adding dilute nitric acid (preferably 5–20% $HNO_3$ added) to a shredded or particulate cellulosic material such as paper to form a reaction mixture and to initiate nitration of the cellulose material, (b) allowing the nitration reaction to take place for a sufficient length of time to achieve approximately a 5–10% nitrogen content dry weight for the reaction products, (c) neutralizing the reaction mixture with, preferably, a neutralizing agent such as potassium hydroxide, calcium hydroxide, calcium oxide or calcium carbonate, to stabilize the reaction products at the approximately 5–10% nitrogen content dry weight, and (d) drying the reaction products to produce the nitrogen fertilizer and soil conditioner.

It should be noted that the present invention does not employ sulfuric acid and the nitric acid employed to treat the cellulosic material is diluted to a concentration of 5–20%. This eliminates the need for high amounts of bases to neutralize the reaction mixture, and avoids the production of sulfur containing salts as a result of the neutralization.

Rather, neutralization is undertaken with lesser amounts of alkaline materials than would be required in a traditional nitration reaction and can be performed with ones which add to the final product instead of detracting. That is, bases such as calcium hydroxide and potassium hydroxide add the essential fertilizer ingredients of calcium and potassium in addition to neutralizing any acid present.

It is also possible to use a phosphorous containing compound in addition to nitric acid and potassium hydroxide so that a complete N-P-K fertilizer is produced. Thus, phosphoric acid can be used along with the nitric acid during the nitration reaction, and potassium hydroxide can, then, be used to neutralize the reaction mixture. This adds nitrogen, phosphorus, and potassium to the resultant cellulosic-based product.

Accordingly, the following objects of the invention exist:

It is an object of this invention to provide a method for producing a fertilizer and soil conditioner from waste paper.

It is a further object of this invention to provide a method for treating cellulosic material whereby nitrogen is chemically bound to the cellulosic material without also adding sulfates.

It is an additional object of this invention to provide a method for increasing the wettability of newsprint and other waste paper so that it will wet and hold moisture better.

It is an additional object of this invention to provide a method for adding calcium, potassium and phosphorous to nitrogen enriched cellulose so as to produce a complete fertilizer.

It is a still further object of this invention to provide a method for incorporating nitrogen into otherwise nitrogen deficient organic materials.

DESCRIPTION OF THE PREFERRED EMBODIMENTS

The addition of dilute nitric acid to waste paper or other organic wastes or materials is followed by neutralization with a base such as calcium hydroxide. This two-step operation results in the addition of organically bound nitrogen to the newspaper or other organic material, thereby substantially improving its value as a fertilizer and plant growth medium. In addition, the resultant nitrated paper product is easily wetted as opposed to untreated waste newsprint which is somewhat hydrophobic.

The addition of nitric acid alone does not produce the desired product. The addition of a neutralizing agent such as potassium hydroxide, calcium hydroxide, calcium oxide, calcium carbonate, or combinations thereof, is necessary to neutralize residual acidity after treatment by the acid and to promote the formation of organically bound nitrogen.

EXAMPLE 1

A 3 gram sample of shredded waste newspaper was treated with 35 ml of $HNO_3$ (70% $HNO_3$ having a specific gravity of 1.42 and, thus, containing 0.994 grams by weight $HNO_3$ per ml), diluted to 10% (0.0994 grams/ml $HNO_3$) so that 3.479 grams by weight of $HNO_3$ was applied. This was left for a 5-day period. The sample was then oven dried at 107° C. and analyzed for nitrogen by the Dumas method. The total nitrogen content analyzed 1.5%. The nitrate nitrogen content ($NO_3$—N) analyzed 0.06%.

EXAMPLE 2

A second 3 g portion of shredded newspaper was treated with 35 ml of 10% solution of the $HNO_3$ utilized in Example 1 (3.479 grams) and after one hour of contact with the nitric acid was neutralized with 4 g of $Ca(OH)_2$. The sample was then oven dried at 107° C. and analyzed for nitrogen by the Dumas method. The total nitrogen content of the oven dried sample was measured as 7.95% with the nitrate nitrogen analyzed at 0.06%.

EXAMPLE 3

A number of tests were conducted using various concentrations of nitric acid to treat waste paper. For the tests, 3 g samples of shredded waste newspaper were treated with 30–35 ml of nitric acid of Example 1 diluted to varying amounts. Times of contact between the acid and paper before neutralization were also varied. Results of these tests are given below:

| Sample No. | $HNO_3$ Conc. | grams $HNO_3$ | Contact Time* | Total Nitrogen (%) | $NO_3$—N(%) |
|---|---|---|---|---|---|
| untreated | — | — | — | 0.00 | 0.000 |
| A | 5% | (1.49–1.74) | 15 min. | 4.98 | — |
| B | 10% | (2.98–3.48) | 15 min. | 6.83 | — |
| G | 10% | (2.98–3.48) | 60 min. | 7.95 | 0.060 |
| F | 20% | (5.96–6.96) | 5 min. | 8.41 | — |
| H3 | 10% | (2.98–3.48) | 60 min. | 5.86 | 0.009 |
| H4 | 10% | (2.98–3.48) | 80 min. | 6.29 | 0.007 |
| H | 10% | (2.98–3.48) | 5 days | 1.50 | 0.060 |

*After given contact time, nitric acid treated paper was neutralized to pH ~ 10.0 with calcium hydroxide except for sample H. Sample H was not neutralized.

The above data shows the ability of the nitric acid treatment and neutralization process to add nitrogen to the waste paper under a range of nitric acid concentrations and at varying contact times before neutralization. It is pointed out that before treatment with nitric acid, the waste paper contained no measurable nitrogen. The data also shows that the nitrate nitrogen ($NO_3$—N) added as $HNO_3$ reacted with the paper (i.e., nitrated) to result in organically bound nitrogen as shown by the very low nitrate nitrogen in the product compared to the relatively high total nitrogen content. It will be noted that nitration occurs rapidly and a reaction time of one hour would ordinarily be sufficient.

The test on sample H shows that neutralization is necessary to prevent losses of nitrogen from the nitric acid treated paper.

EXAMPLE 4

A portion of treated waste paper was prepared by adding 330 ml of a 10% solution of the $HNO_3$ of Example 1 (32.8 grams) to 30 g of shredded waste newspaper. The sample was heated in an oven at a temperature of 107° C. for a period of sixty minutes to accelerate reaction of nitric acid with the paper. After contact of acid with the paper for a total period of 110 minutes, the sample was neutralized with 40 g of $Ca(OH)_2$. The sample was dried in an oven at 107° C. overnight. Total dry weight yield of treated paper was 85.3 g containing 5.7% total nitrogen.

Using the above prepared fertilizer material, an experiment was conducted to demonstrate the influence of the treated paper on plant growth. Predominantly sandy subsoil materials were mixed with varying amounts of both the treated paper and untreated paper and was seeded with a mixture of perennial ryegrass and Kentucky bluegrass. Individual experiments were as follows:

| Trial No. | Amount of Sand | Amount of Treated Waste Paper | Amount of Untreated Waste Paper |
|---|---|---|---|
| Control | 500 g | 0 g | 0 g |
| 1 | 500 g | 1 g | 1 g |
| 2 | 500 g | 2 g | 2 g |
| 3 | 500 g | 3 g | 3 g |

The seeded packs were placed outdoors and allowed to grow for a period of one month. At the end of the one-month period, above-ground vegetation was harvested and dry and wet biomass yield measured as well as total nitrogen content. Results are summarized below:

| Trial No. | Wet Biomass Yield (g) | Dry Biomass Yield (g) | Total Nitrogen (Kjeldahl) |
|---|---|---|---|
| Control | 1.7942 | 0.302 | 1.63 |
| 1 | 3.9904 | 0.636 | 2.38 |
| 2 | 5.0012 | 0.829 | 2.80 |

| Trial No. | Wet Biomass Yield (g) | Dry Biomass Yield (g) | Total Nitrogen (Kjeldahl) |
|---|---|---|---|
| 3 | 3.2778 | 0.717 | 1.98 |

The data shows that biomass and nitrogen content of grass foliage are increased over control when the nitric acid treated and neutralized paper is used as a fertilizer (Trial 1, 2, 3). Trial No. 3 showed that dosage was increased beyond that required for maximum yield.

In the above examples, a fertilizer-soil conditioner product enriched in organically bound nitrogen was produced. The two other principal plant nutrients, phosphorus and potassium, can also be incorporated into a fertilizer-soil conditioner product produced from waste newsprint or other organic matrix.

EXAMPLE 5

A mixture was prepared of 1000 ml of a 10% solution of the $HNO_3$ of Example 1 (99.4 grams) and 165 ml of $H_3PO_4$ (85.5% $H_3PO_4$ having a specific gravity of 1.68 and, thus, containing 1.44 grams by weight $H_3PO_4$ per ml) diluted to 10% (0.144 grams/ml) so that 23.76 grams by weight of $H_3PO_4$ was added. This was reacted with 100 g of shredded waste newsprint. After one hour, the reactants were neutralized with 145 g of KOH. Brief heating on a hot plate was necessary to initiate a brownish color in the otherwise greyish pulp after the acid mixture was added. After neutralization of the acid treated paper with KOH, the resultant pH was 8.0.

The neutralized paper was dried at 107° C. The yield of dried material was 285.5 g. Analysis of the dried material was as follows:

| | |
|---|---|
| Total N | 7.10% |
| $NO_3$—N (soluble) | 0.24% |
| Total K | 19.30% |
| soluble | 18.80% |
| insoluble | .48% |
| Total P | 2.73% |

As in the other examples, the soluble inorganic nitrogen added as nitric acid was almost completely converted to organically bound nitrogen. Potassium in the final product remained soluble.

Using the N-P-K fertilizer material of Example 5, greenhouse experiments were conducted with ryegrass and tomatoes.

EXAMPLE 6

Using a low fertility sandy subsoil with the following analysis:

| | |
|---|---|
| pH | 4.9 |
| sol. $NO_3$ | 4.0 ppm |
| avail. K | 25.0 ppm |
| avail. P | 1.4 ppm | a number of 9-inch diameter clay pots were filled to a depth of 7 inches with the soil. Varying amounts of an N-P-K fertilizer produced from the treatment of waste newsprint as set forth in Example 5, was mixed with the top 4 inches of soil (8 lbs., 12 oz.) and seeded with thirty-two seeds of ryegrass. Replicates (A and B) were made for each treatment level as summarized below:

| | |
|---|---|
| CR-A, B | sandy subsoil, no additive |
| CPR-24A, 24B | 24g shredded newspaper added |
| NPKR-4A, 4B | 4g NPK fertilizer added |
| NPKR-8A, 8B | 8g NPK fertilizer added |
| NPKR-16A, 16B | 16g NPK fertilizer added |
| NPKR-24A, 24B | 24g NPK fertilizer added |

After 27 days, the above-ground ryegrass plant material was harvested, weighed, dried, and weighed again. Results of biomass yields are given below:

| Treatment | Biomass Yield (g) | |
|---|---|---|
| | Wet | Dry |
| CRA | 8.9 | 2.0 |
| CBR | 11.3 | 2.2 |
| CPR-24A | 5.7 | 1.2 |
| CPR-24B | 6.8 | 1.5 |
| NPKR-4A | 43.7 | 9.6 |
| NPKR-4B | 47.0 | 9.4 |
| NPKR-8A | 83.3 | 20.4 |
| NPKR-8B | 76.8 | 13.7 |
| NPKR-16A | 133.9 | 23.8 |
| NPKR-16B | 141.4 | 24.8 |
| NPKR-24A | 135.9 | 25.3 |
| NPKR-24B | 158.7 | 22.6 |

The procedure was repeated where three tomato seeds were planted in each pot. Replicates (A and B) were made for each treatment level as summarized below:

| | |
|---|---|
| CT-A, B | sandy subsoil, no additives |
| CPT-A, B | 24g shredded newspaper added |
| NPKT-4A, B | 4g NPK fertilizer added |
| NPKT-8A, 8B | 8g NPK fertilizer added |
| NPKT-16A, 16B | 16g NPK fertilizer added |
| NPKT-24A, 24B | 24g NPK fertilizer added |

After 111 days the tomato fruit (red and green) was harvested and wet and dry biomass fruit measurements made. Results of biomass yields are given below:

| Treatment | Fruit Biomass (g) | |
|---|---|---|
| | Wet | Dry |
| CT A | No fruit | |
| CT B | | |
| CPT A | No fruit | |
| CPT B | | |
| NPKT-4A | 74.4 | 2.72 |
| NPKT-4B | 75.8 | 3.00 |
| NPKT-8A | 121.7 | 5.43 |
| NPKT-8B | 170.3 | 4.97 |
| NPKT-16A | 338.5 | 6.50 |
| NPKT-16B | 354.2 | 5.62 |
| NPKT-24A | 470.1 | 6.10 |
| NPKT-24B | 311.8 | 5.72 |

In the fertilizer made in the above examples, it was intended that all of the chemicals added would become part of the resultant fertilizer. The volumes of liquid added to the paper were controlled so as to produce a product which, upon drying, produces no residual solution. The added chemicals and nitration of the paper increases the dried weight of the paper to almost 300% of its original weight, as shown in Examples 4 and 5.

It has been found that the following proportions of the various constituents produce a desired fertilizer product: For every gram of waste paper, 1–1.7 grams of nitric acid on a dry weight basis, present in a 10% solution, is sufficient to completely wet the paper and initiate the desired nitration. The nitric acid can be varied from 0.5–2.4 grams/gram of waste paper, however, to achieve different degrees of nitration, if desired, and the treatment concentration can be varied between 5 and 20% to achieve sufficient wetting. The preferred amount of phosphoric acid depends upon the desired phosphorous content and may range from 0 to 1 gram per gram of cellulosic material on a dry weight basis, but 0.25–0.50 grams of phosphoric acid, present as a 10% solution, is generally preferred. Neutralization of the excess nitric acid is necessary to produce a fertilizer product which is not detrimental to plants as well as to prevent loss of nitrogen. Calcium hydroxide, calcium carbonate, calcium oxide, potassium hydroxide and combinations thereof are suitable for neutralization because they provide the essential elements, calcium and potassium. For either calcium or potassium hydroxide, 0.85–1.33 grams are desirable to neutralize each initial gram of nitric acid.

The potassium compounds absorbed into the paper upon drying occur as soluble salts including potassium hydroxide and minor amounts of potassium nitrate. The phosphorus compounds, however, may be soluble or insoluble depending upon the compound used for neutralization. If CaO is used, insoluble $Ca_3(PO_4)_2$ results, whereas if KOH is used, then $K_3PO_4$ and KOH will be admixed with the paper and will resolubilize upon sufficient wetting. If $Ca(OH)_2$ or $CaCO_3$ are used insoluble $Ca_3(PO_4)_2$ will result.

Although the present invention has been specifically described in terms of the nitration of waste paper, any cellulosic material may be satisfactorily used. Additionally, the N-P-K percentages as well as the amounts of other elements may be adjusted, as desired, with an upper nitrogen limit of about 10% dry weight. It is therefore intended that the scope of the present invention is to be limited only by the scope of the appended claims.

What is claimed is:

1. A method for producing a fertilizer and soil conditioner including the steps of:
   a. adding dilute nitric acid to a shredded or particulate cellulosic material to form a reaction mixture and to initiate nitration of the cellulosic material whereby nitrogen is organically bound to the cellulosic material;
   b. allowing said nitration to take place for a sufficient length of time to achieve approximately a 5–10% nitrogen content dry weight for the reaction products;
   c. neutralizing the reaction mixture to stabilize the reaction products at said approximately 5–10% nitrogen content dry weight; and
   d. drying the reaction products to produce a nitrogen fertilizer and soil conditioner.

2. The method of claim 1 wherein the step of neutralizing said reaction mixture is achieved by adding a neutralizing agent selected from the group consisting of potassium hydroxide, calcium hydroxide, calcium oxide, calcium carbonate and mixtures thereof to thereby add additional nutrients to the fertilizer and soil conditioner.

3. The method of claim 1 wherein the cellulosic material is paper.

4. The method of claim 1 wherein dilute phosphoric acid is added to said cellulosic material along with said nitric acid to produce a nitrogen-phosphorus fertilizer and soil conditioner.

5. The method of claim 4 wherein said neutralizing agent contains potassium hydroxide to produce a nitrogen-phosphorus potassium fertilizer and soil conditioner.

6. The method of claim 5 wherein the cellulosic material is paper.

7. The method of claim 4 wherein the cellulosic material is paper.

8. A method for producing an N-P-K fertilizer and soil conditioner including the steps of:
   a. adding a mixture of 0.5–2.4 grams by weight of nitric acid present as a 10% solution and 0.1 grams by weight of phosphoric acid present as a 10% solution for each gram weight of cellulosic material to a shredded paper cellulosic material to form a reaction mixture and to initiate nitration of the shredded paper whereby nitrogen is organically bound to the shredded paper;
   b. allowing said nitration to take place for a sufficient length of time to achieve approximately a 5–10% nitrogen content dry weight for the reaction products;
   c. adding 0.85–1.33 grams of potassium hydroxide per initial gram of nitric acid added to neutralize the reaction mixture and to stabilize the reaction products; and
   d. drying the reaction products to produce an N-P-K fertilizer and soil conditioner.

9. The method of claim 8 wherein 1–1.7 grams of nitric acid and 0.25–0.50 grams of phosphoric acid by weight are added to each gram of shredded paper.

10. An N-P-K fertilizer comprising:
    a nitrated cellulosic material having nitrogen organically bound thereto in a nitrogen content of about 5 to 10% dry weight and further containing phosphorus and potassium values.

11. The N-P-K fertilizer of claim 10 wherein said cellulosic material is produced by a process including the steps of:
    (a) adding dilute nitric acid and dilute phosphoric acid to a shredded particulate cellulosic material to form a reaction mixture and to initiate nitration of the cellulosic material, nitrogen thereby being organically bound to the cellulosic material;
    (b) allowing said nitration to take place for a sufficient length of time to achieve approximately a 5 to 10% nitrogen content dry weight for the reaction products;
    (c) neutralizing the reaction mixture with potassium hydroxide to stabilize the reaction products at said approximately 5 to 10% nitrogen content dry weight; and
    (d) drying the reaction products to produce a nitrogen fertilizer and soil conditioner.

12. The N-P-K fertilizer of claim 11 wherein said nitrated cellulosic material is produced from paper.

13. In a soil treatment wherein a fertilizer and/or soil conditioner is applied to the soil, the improvement wherein said fertilizer and/or soil conditioner is prepared by a process including the steps of:
    a. adding dilute nitric acid to a shredded or particulate cellulosic material to form a reaction mixture and to initiate nitration of the cellulosic material whereby nitrogen is organically bound to the cellulosic material;

b. allowing said nitration to take place for a sufficient length of time to achieve approximately a 5 to 10% nitrogen content dry weight for the reaction products;

c. neutralizing the reaction mixture to stabilize the reaction products at said approximately 5 to 10% nitrogen content dry weight; and d. drying the reaction products to produce a nitrogen fertilizer and soil conditioner.

14. The soil treatment of claim 13 wherein said cellulosic material is paper.

15. The soil treatment of claim 13 wherein said fertilizer and/or soil conditioner is an N-P-K fertilizer.

16. The soil treatment of claim 15 wherein phosphoric acid is added to said cellulosic material along with said nitric acid and said neutralization step is achieved by adding a neutralizing agent which contains potassium hydroxide to the reaction mixture.

* * * * *